(12) United States Patent
Herrera Stromberg

(10) Patent No.: US 9,797,769 B2
(45) Date of Patent: Oct. 24, 2017

(54) INFRARED DETECTION DEVICE AND MASKING SECTION

(71) Applicant: Pyronix Limited, Hellaby/Rotherham (GB)

(72) Inventor: Juan Sebastian Herrera Stromberg, Moorgate Grove/Rotherham (GB)

(73) Assignee: Pyronix Limited, Hellaby/Rotherham (GB)

( * ) Notice: Subject to any disclaimer, the term of this patent is extended or adjusted under 35 U.S.C. 154(b) by 55 days.

(21) Appl. No.: 14/709,807

(22) Filed: May 12, 2015

(65) Prior Publication Data
US 2015/0346023 A1    Dec. 3, 2015

Related U.S. Application Data

(63) Continuation of application No. PCT/GB2013/052970, filed on Nov. 12, 2013.

(51) Int. Cl.
| | | |
|---|---|---|
| *G01J 5/08* | (2006.01) |
| *G01J 1/04* | (2006.01) |
| *G01J 1/42* | (2006.01) |
| *G08B 13/193* | (2006.01) |
| *G01J 5/04* | (2006.01) |
| *G01J 5/34* | (2006.01) |
| *G01J 5/00* | (2006.01) |

(52) U.S. Cl.
CPC .............. *G01J 1/0437* (2013.01); *G01J 1/42* (2013.01); *G01J 5/0025* (2013.01); *G01J 5/04* (2013.01); *G01J 5/0806* (2013.01); *G01J 5/0831* (2013.01); *G01J 5/34* (2013.01); *G08B 13/193* (2013.01)

(58) Field of Classification Search
CPC ........ G01J 5/02; G01J 5/08; G01J 1/04; G01J 1/42
USPC ............................................ 250/353, 515, 1
See application file for complete search history.

(56) References Cited

U.S. PATENT DOCUMENTS 5,670,943 A    9/1997   DiPoala et al.
5,818,337 A    10/1998  Erismann

FOREIGN PATENT DOCUMENTS

| CN | 2609083 Y | 3/2004 |
| DE | 19639318 C1 | 12/1997 |
| EP | 0421119 | 4/1991 |

(Continued)

OTHER PUBLICATIONS

International Search Report and Written Opinion issued by the European Patent Office as International Searching Authority for International Application No. PCT/GB2013/052970 dated Feb. 27, 2014 (10 pages).

(Continued)

*Primary Examiner* — David Porta
*Assistant Examiner* — Meenakshi Sahu
(74) *Attorney, Agent, or Firm* — Wilmer Cutler Pickering Hale and Dorr LLP

(57) ABSTRACT

An infra-red detection device comprising an infra-red detection section; a plurality of optical elements arranged to direct infra-red radiation to the infrared detection section; and a masking section arranged to partially mask a first optical element of the plurality of optical elements, such that a first part of the first optical element is masked and a second part of the first optical element is not masked, such that the masking section is arranged to attenuate infra-red radiation directed via the first optical element.

14 Claims, 8 Drawing Sheets

(56) References Cited

FOREIGN PATENT DOCUMENTS

| | | |
|---|---|---|
| EP | 1612750 A1 | 1/2006 |
| EP | 1647955 A1 | 4/2006 |
| EP | 1847822 A1 | 10/2007 |
| GB | 2369450 A | 5/2002 |
| JP | S61126432 A | 6/1986 |
| TW | M242802 U | 9/2004 |
| TW | M242803 U | 9/2004 |
| WO | WO-01/67414 | 9/2001 |

OTHER PUBLICATIONS

International Preliminary Report on Patentability issued by the International Bureau of WIPO for International Application No. PCT/GB2013/052970 dated May 19, 2015 (8 pages).
No Author Listed, "MR-4000 Flush Mount PIR Detector Installation Instructions," Visonic Ltd, DE1141, pp. 1-4 (1998).

INFRARED DETECTION DEVICE AND MASKING SECTION

CROSS-REFERENCE TO RELATED APPLICATIONS

This application is a continuation of and claims priority to International Application No. PCT/GB2013/052970, filed Nov. 12, 2013, entitled "Infrared Detection Device and Masking Section", which claims the benefit of priority to United Kingdom Patent Application No. 1220410.3, filed Nov. 13, 2012, the disclosures of each of which are incorporated by reference in their entirety.

BACKGROUND

Field of the Disclosure

This invention relates to a device for detecting infrared radiation, and to a masking section for use with such a detector.

Description of Related Art

Infrared detectors are well known and used in various applications, such as intrusion monitoring. In intrusion monitoring it is known to detect infrared radiation emitted by an intruder using a passive infrared (PIR) detector. Typically a PIR detector includes an infrared detection section and an optical system for directing the infrared radiation from a protected area to the detection section.

Typically, infrared detectors in intrusion detection systems are not able to distinguish accurately between intruders and pets (or other small animals) resulting in undesirable false alarms. To address this problem, the optical system of the infrared detector may be blocked to prevent infrared radiation from detection zones close to the floor from reaching the detection section. Most pets and small animals are expected to remain in these lower detection zones, in contrast to a human intruder that is expected to be detectable in regions higher above the floor.

Some infrared intrusion detection systems increase a threshold for detection. This may be a level which the signal from the infrared detector must exceed before an intruder is considered to be detected, such that a signal due to a pet is insufficient to be considered a detection. This can be achieved electronically in the signal processing from the detector. Some infrared intrusion detection systems distinguish between humans and animals by using algorithms based, for example on input from additional sensors (e.g. video cameras).

BRIEF SUMMARY OF THE DISCLOSURE

An aspect of the invention provides an infra-red detection device comprising an infra-red detection section; a plurality of optical elements arranged to direct infra-red radiation to the infrared detection section; and a masking section arranged to partially mask a first optical element of the plurality of optical elements, such that a first part of the first optical element is masked and a second part of the first optical element is not masked, such that the masking section is arranged to attenuate infra-red radiation directed via the first optical element.

The first part of the first optical element may be masked by a portion of the masking section that is opaque to infrared radiation. Each optical element may be a Fresnel facet. The optical elements may be such that a detection zone associated with each optical element is unaffected by the presence or absence of the masking section. The masking section may partially mask optical elements positioned along respective first and second, substantially perpendicular, directions from the first optical element.

The masking section may partially mask a lower optical element arranged, when in use, to have a detection zone lower than a detection zone of the first optical element. Attenuation by the masking section may be less for infrared from the detection zone of the first optical element than for infrared from the detection zone of the lower optical element. A proportion of the first optical element masked by the masking section may be less than a proportion of the lower optical element masked by the masking section.

The infra-red detection device may be arranged such that at least one upper optical element has a detection zone higher, when in use, than the detection zone of the first optical element, and the upper optical element is not blocked by the masking section.

At least one optical element may be completely masked by the masking section. The masking section may be removable.

An aspect of the invention provides a masking section arranged for use in the infra-red detection device.

A further aspect provides a kit comprising a plurality of the masking sections, where the masking sections arranged to differ from each other by masking different optical elements and/or masking different proportions of the optical elements.

An aspect of the invention provides a method of modifying an infra-red detection device having an infra-red detection section and a plurality of optical elements arranged to direct infra-red radiation from respective detection zones onto the infra-red detection section, the method comprising: partially masking a first optical element of the plurality of optical elements by placing a masking section such that a first part of the first optical element is masked by a portion of the insert that is opaque to infra-red radiation. The method may further comprise removing a previous masking section before partially masking the first optical element.

Aspects and embodiments of the invention have the object of providing an improvement over existing detectors. Some embodiments for use in intrusion detection systems have the aim of reducing false alarms. Some embodiments aim to reduce false alarms generated by erroneously detecting a pet or other small animal as an intruder.

BRIEF DESCRIPTION OF THE DRAWINGS

Embodiments of the invention are further described hereinafter with reference to the accompanying drawings, in which:

FIG. 7b illustrates the detection zones associated with the optical section of FIG. 7a.

DETAILED DESCRIPTION

Blocking lower detection zones, as described above, to avoid a pet registering as an intruder results in a "dead zone" in which an intruder may escape detection, for example by crawling below the level of the unblocked region. Increasing a threshold for detection, as described above, may require increased complexity in the electronics of the device, and affects all of the detection zones associated with the detector; not only those zones in which a pet is likely to be found. Using algorithms and/or additional sensors to distinguish humans and animals requires increased complexity, and may be a source of errors (either false positives of false negatives).

Figure 1:
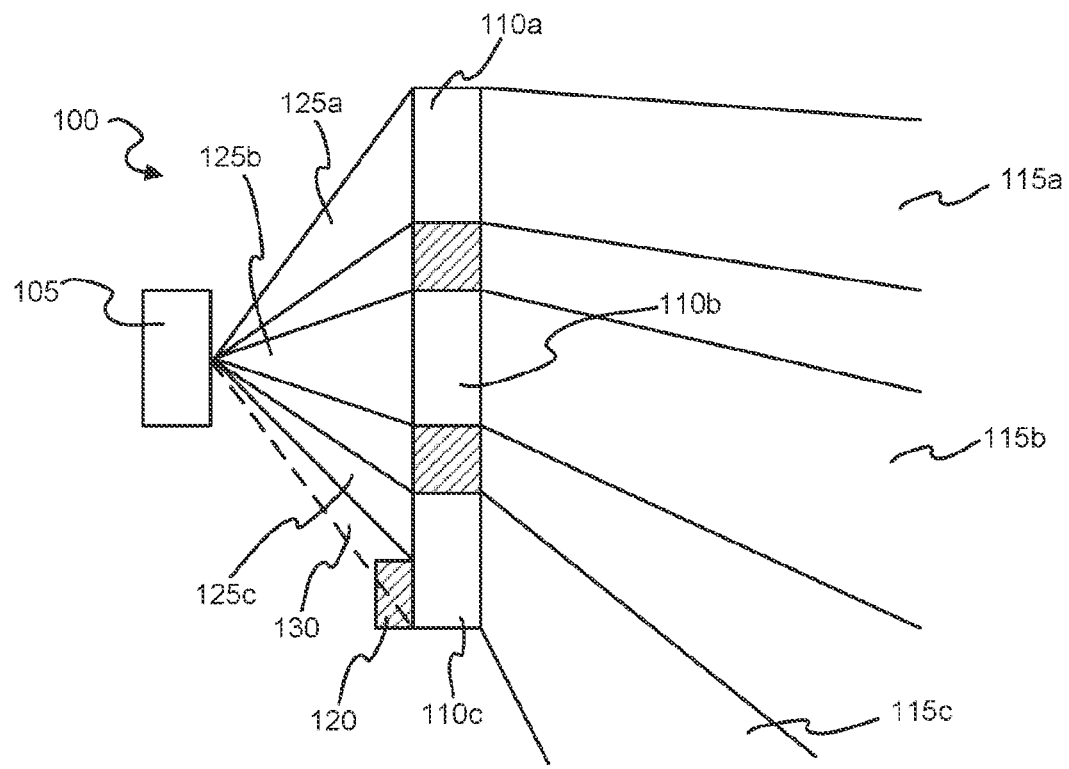
FIG. 1 is a schematic illustration of a detection device according to an embodiment of the invention.

The infrared detecting device 100 of FIG. 1 includes an infrared detection section 105, and a plurality of optical elements 110a-110c. The infrared detection section may be a pyroelectric sensor, and the optical elements 110 may be Fresnel lenses. Each optical element directs infrared radiation from a corresponding detection zone 115a-115c to the infrared detection section 105. A masking section 120 is provided to partially mask one or more of the optical elements. In FIG. 1, optical elements 110a and 110b are not masked by the masking section 120, and optical element 110c is partially masked by the masking section 120, such that infrared radiation from the detection zone 115c is attenuated by the masking section 120, but infrared radiation from detection zones 115a and 115b is not attenuated by the masking section 120.

Infrared radiation directed to the detection section 105 from the respective optical elements 110 is illustrated by 125a-125c. Infrared radiation 125a, 125b from optical elements 110a and 110b is not attenuated by the masking section 120, whereas infrared radiation 125c from detection zone 115c, via optical element 110c, is attenuated by the masking section 120. Due to the presence of the masking section 120 a portion of infrared radiation schematically illustrated as 130 does not reach the detection section 105. In the absence of the masking section 120, the portion of infrared radiation 130 would reach the detection section 105.

With this arrangement, the sensitivity of detection in zone 115c is reduced without affecting the sensitivity in detection zones 115a and 115b. Furthermore, detection of infrared radiation from zone 115c is still possible (e.g. a "dead zone" is not produced.)

The arrangement of FIG. 1 may be used in intrusion detection systems or other detection systems to reduce the occurrence of unwanted detection of small infrared sources in the detection zone(s) corresponding to the partially masked optical element(s). For example, in an intruder detection system the masking section 120 may mask lower detection zones (e.g. intersecting with a floor) where pets or other small animals may be expected. Pets and small animals have a lower output of infrared radiation than an adult human, and by suitable selection of the degree of masking, the infrared radiation reaching the detection section 105 from detection zone 115c can be reduced such that the infrared output of a pet is insufficient to register as a detection event (e.g. by reducing the infrared radiation at the detection section 105 below a threshold level for triggering an alarm). In contrast a human intruder generally has a higher infrared output than a pet or small animal, and the masking may be selected such that the infrared output from a human in detection zone 115c is sufficient to register as a detection event, notwithstanding the presence of masking section 120. Accordingly, the arrangement of FIG. 1 may be applied in an intrusion detection system such that there is no detection of (or an alarm is not triggered by) pets or small animals in one (or more) selected detection zones, but that is still able to detect a human in that zone (or zones). Furthermore, other zones are not affected by the masking, so sensitivity is not reduced in these other zones.

Figure 2:
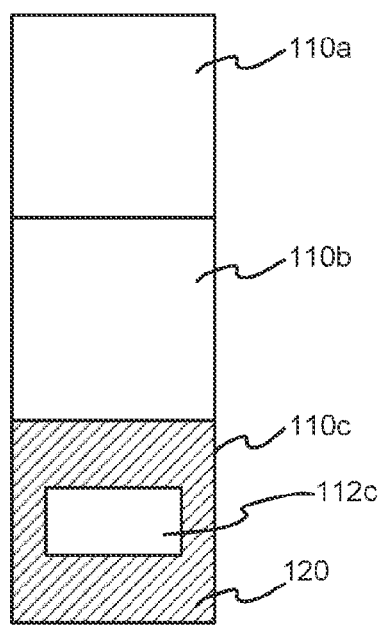
FIG. 2 is a schematic illustration of an optical section and masking section in accordance with an embodiment of the invention.

FIG. 2 illustrates an example of masking section 120 partially masking optical element 110c. In this example, the masking section does not mask optical elements 110a or 110b, and leaves portion 112c of optical element 110c unmasked. Thus the infrared radiation received at the detection section 105 from optical elements 110a and 110b is not attenuated. According to the arrangement illustrated in FIG. 2 the masking section is essentially opaque to infrared radiation, such that infrared radiation in detection zone 115c reaches the detection section 105 only via portion 112c of optical element 110c, and not via the masked portion of optical element 110c.

The attenuation of the infrared radiation from optical element 110c by the masking section 120 is due to the masking section 120 reducing the effective area (surface area) of optical element 110c. Where the optical element is a Fresnel lens, for example, the area of the lens is proportional to the optical gain and so the fraction of the lens that is masked corresponds to the degree of attenuation.

FIG. 2 illustrates an arrangement having a masking section that is opaque to infrared radiation that partially covers an optical element. However, attenuation of the infrared radiation from detection zone 115c may be achieved in various ways. For example, the material or thickness of the optical elements may be varied, or a member translucent to infrared radiation may be provided that covers the entire area of an optical element and attenuates infrared radiation across the whole optical element. This may require a high degree of consistency in the composition when producing the translucent member, as this may affect the degree of attenuation.

The arrangement shown in FIG. 2, having an opaque masking section 120, allows the degree of attenuation to be accurately controlled by controlling the portion of the optical element that is masked. Standard tooling methods allow the masking section 120 to be accurately shaped, allowing very good control of the masked area of the optical element and so the degree of attenuation achieved by the masking section 120. In the arrangement of FIG. 2 it is not necessary to accurately control the level of translucency of the masking section (e.g. to control the degree to which the material of the mask attenuates infrared radiation passing through the material of the mask), accordingly ease of construction and reliability may be improved.

FIG. 1 illustrates the masking section 120 as being positioned between the optical element 110c and the detection section 105, or "behind" the optical section, such that infrared radiation transmitted by the optical element 110c toward the detection section 105 encounters and is partially obscured by the masking section 120. However, the masking section may alternatively be placed "in front of" the optical section, such that infrared radiation from the detection zone 115c encounters and is partially obscured by the masking section.

FIGS. 1 and 2 illustrate the masking section 120 in contact with, or close to the optical element 110c, however, the masking section 210 may alternatively be separated from the optical element 110c. When the masking section 120 is essentially in contact with the optical element 110c alignment of the optical element 110c and the masking section 120 is simplified.

The masking section 120 may be removable. This provides a device with improved flexibility, as the masking section may be used or removed from the detecting device depending on operating conditions. For example, the masking section 120 may be omitted where the detecting device is for use in an intrusion detection system in a location where there are no pets, or in a system where detection of small animals is desirable, such that there is no need to reduce the sensitivity in any of the detection zones. Where the masking section 120 is removable, a selection of masking sections may be provided, allowing the attenuation of infrared radiation from various detection zones to be tuned. For example, a short-haired dog emits more infrared radiation than a long-haired dog of equal size. Different degrees of masking or attenuation may be desirable in order to avoid unnecessary reduction in sensitivity, while avoiding detection of (e.g. alarm triggering by) a particular pet. This can be achieved by selecting and installing a masking section appropriate to the type and size of pet. Other factors, such as thermal properties of the background may also be taken into account when selecting a masking section or degree of masking. For example, carpet tends to produce a higher background temperature than tiling, affecting the degree of attenuation required of the masking section. Removable/replaceable masking sections may also permit variation in the pattern of attenuation.

In some arrangements, in addition to one or more partially masked optical elements, one (or more) of the optical elements may be completely masked (or blocked) by the masking section, such that no infrared radiation from the corresponding detection zone arrives at the detection section 105 via the blocked detection element.

The optical elements 110 may be lenses, and in some embodiments may be Fresnel lenses or portions of Fresnel lenses (Fresnel facets). Where Fresnel lenses are used, partial masking of the lens by an opaque masking section 120 does not affect the shape or area of the corresponding detection zone. This allows use of an infrared-opaque masking section for partially masking detection element without reducing the spatial extent of the corresponding detection zone.

Figure 3:
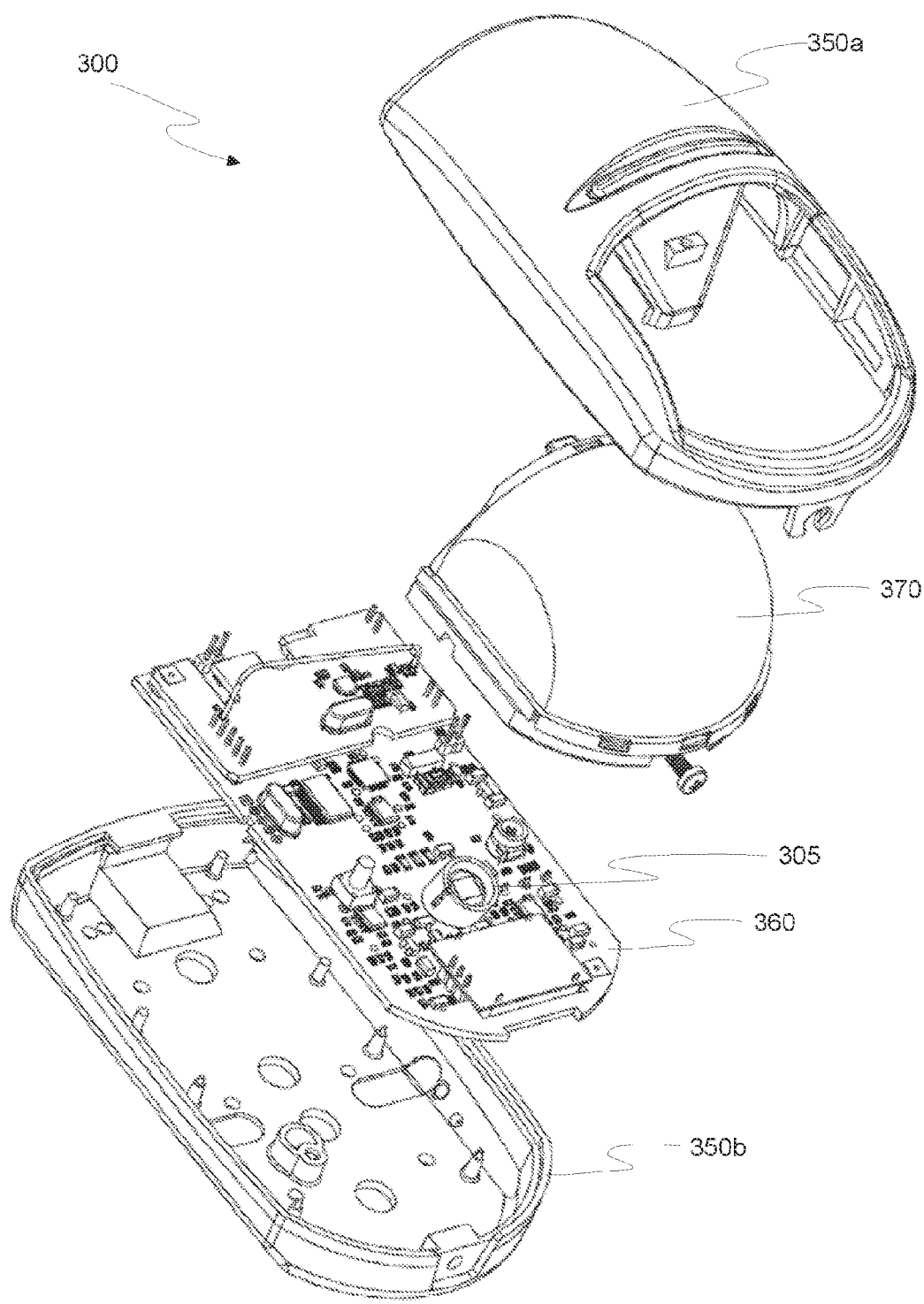
FIG. 3 is a perspective view of a detection device according to an embodiment of the invention.

FIG. 3 is an exploded view of a detection device for use with an embodiment of the invention. The detection device includes a housing 350a and 350b for retaining and protecting the elements of the detection device. Circuit board 360 is provided in the housing 350, and includes a pyroelectric sensor 305. The circuit board may also include other elements for providing power to and receiving signals from the pyroelectric sensor 305. The circuit board may include processing components to evaluate or process a signal from the pyroelectric sensor 305, for example by performing a comparison with a threshold. Other components may also be provided; for example DIP switches for changing unit settings, and/or tamper protection/detection components. Electrical power for the detection device, and circuit board 360 in particular, may be from an external source, such as mains electricity, or an internal source, such as a battery or capacitor, or a combination.

The sensor 305 in the present embodiment includes a pair of pyroelectric elements connected in series opposition, although other arrangements for the sensor are possible. For each optical element, the masking may be such that the degree of attenuation of the infrared radiation from that element is the same for both of the opposed pyroelectric elements. Where the masking of an optical element is the same for both of the opposed pyroelectric elements, false positives and false negatives may become less likely. Providing the masking section essentially in contact with the optical elements provides a simple structure that can help to provide the same degree of attenuation for both of the opposed pyroelectric sensors, with respect to infrared radiation received from the optical element.

Optical module 370 includes the optical elements, and is arranged such that infrared radiation is directed by the optical elements from respective detection zones onto the pyroelectric sensor 305. In the present embodiment, the optical elements are Fresnel facets.

Figure 4A:
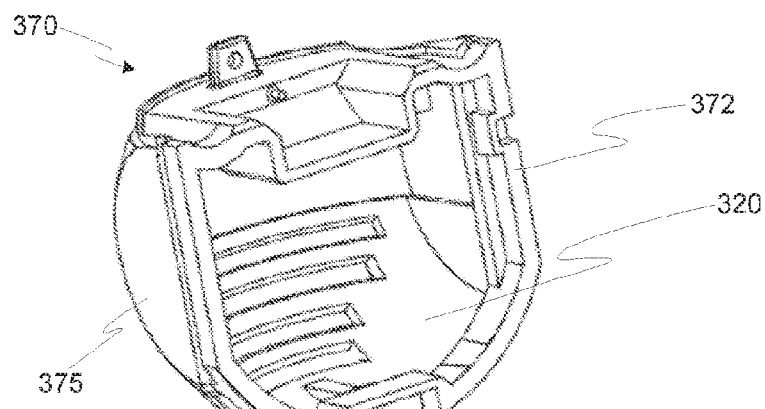
FIG. 4*a* is a perspective view of an optical module in accordance with an embodiment of the invention.
Figure 4B:
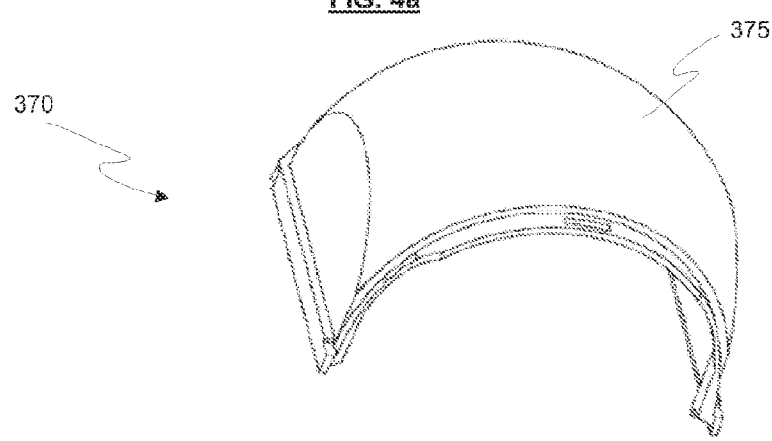
FIG. 4*b* is an exploded view of an optical module of FIG. 4*a*.
Figure 4B:
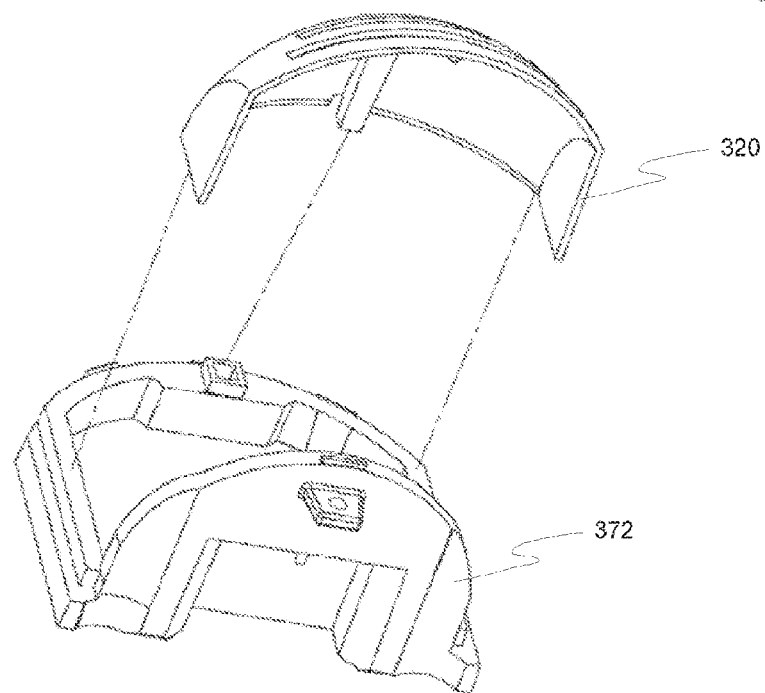

FIG. 4a shows a rear view of the optical module 370, and FIG. 4b shows an exploded view of the optical module 370. Optical section 375 includes a plurality of Fresnel facets, respectively forming optical elements, and may be produced by molding a suitable plastic. Masking section 320 is shaped to fit against the optical section 375 and is held in place by retaining member 372. Retaining member is attached, either integrally, permanently or releasably, to the housing 350b. According to the current embodiment, the masking section 320 is behind the optical elements 110, that is, between the optical elements 110 and the pyroelectric sensor 305.

Figure 5A:
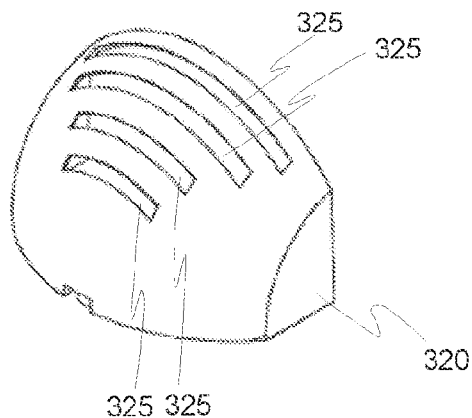
FIG. 5*a* is a perspective view of a masking section according to an embodiment of the invention.
Figure 5B:
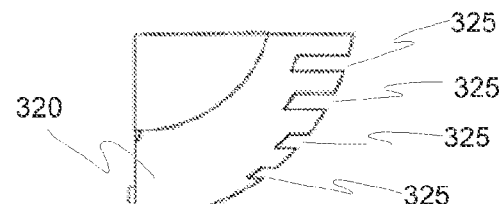
FIG. 5*b* is a side view of the masking device of FIG. 5*a*.
Figure 5C:
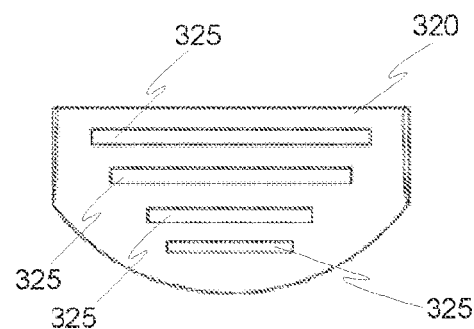
FIG. 5*c* is a front view of the masking device of FIG. 5*a*.

The masking section 320 of the current embodiment is shown in FIG. 5. The masking section is essentially opaque to infrared radiation. The masking section may, for example, be molded from a plastic or resin that absorbs substantially all of the incident infrared radiation, or may have an infrared-opaque coating (such as a suitable paint). FIG. 5a shows a perspective view of the masking section 320, FIGS. 5b and 5c show side and front views, respectively. The masking section includes a plurality of holes or voids 325. When the masking section 320 is correctly positioned relative to the optical section 375, the masking section partially masks a subset of the Fresnel facets. According to the present embodiment, holes 325 correspond to unmasked portions of Fresnel facets. The shape of the masking section is not particularly limited, provided prescribed portions of prescribed Fresnel facets are masked. The arrangement of FIG. 5, having slot-shaped holes has the advantage of being relatively simple to produce. A single hole may correspond to unmasked portions of more than one Fresnel facet.

Figure 6A:
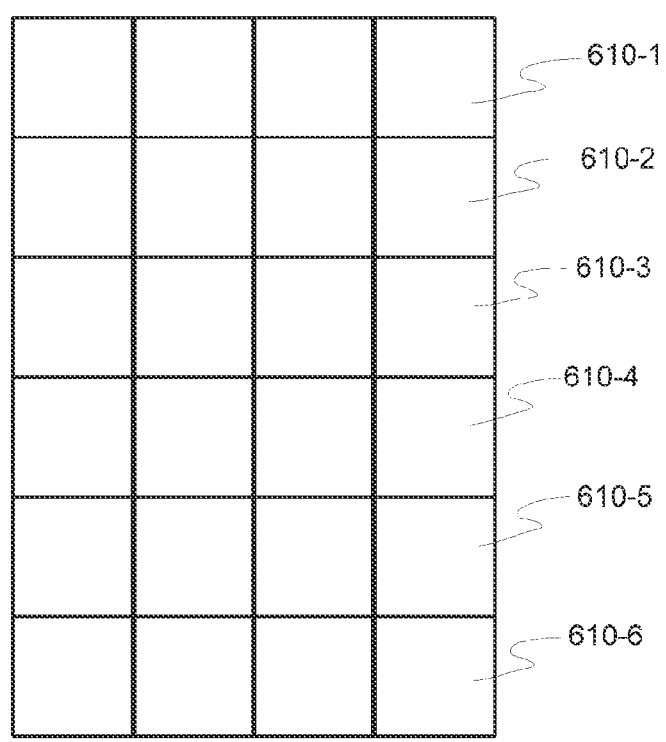
FIG. 6*a* is a schematic illustration of an optical section.
Figure 6B:
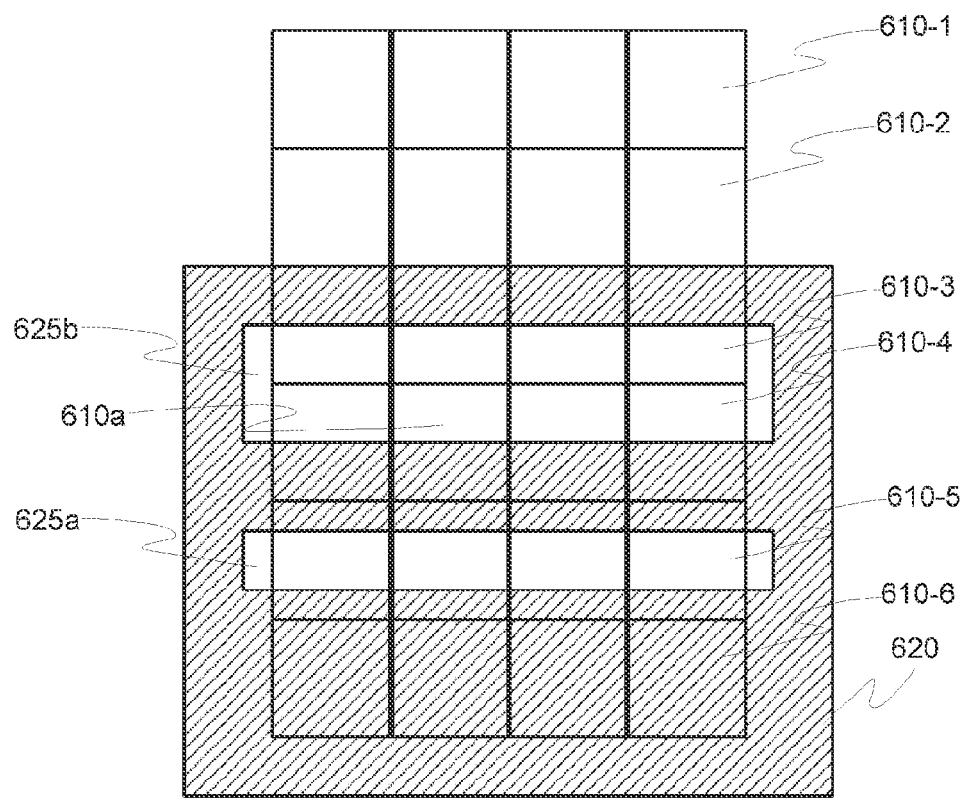
FIG. 6b is a schematic illustration of the optical section of FIG. 6a and masking section in accordance with an embodiment of the invention.

FIG. 6 shows simple examples of masking patterns of the Fresnel facets by the masking section. FIG. 6a illustrates a simple array of six rows 610-1 to 610-6 of unmasked Fresnel facets. FIG. 6b shows a masking section 620 superimposed over the Fresnel facets. This exemplary masking section has two slots (or holes, voids, etc) 625. Rows 610-1 and 610-2 are not masked by the masking section 620. Row 610-6 is completely masked by the masking section 620, such that no infrared radiation is provided to the detection section via row 610-6. Rows 610-3, 610-4 and 610-5 are partially masked by the masking section 620, such that infrared radiation reaching the detection section via these rows is attenuated by the masking section 620. Hole 625a is positioned over a portion of row 610-5. Hole 625a is not positioned over any other rows. Accordingly, infrared radiation reaching the detection section via hole 625a is focused only by Fresnel facets in row 610-5. Hole 625b is positioned over a portion of row 610-3 and a portion of row 610-4. Accordingly, infrared radiation reaching the detection section via hole 625b is via Fresnel facets in rows 610-3 and 610-4. According to some embodiments, a hole (or other void, vacancy or gap) in the masking section may partially expose a single optical element, or may partially expose a plurality of optical elements. Other arrangements of optical elements may be partially exposed by a hole; the hole need not be linear. The shape, orientation and registration of the masking section (and any holes therein) with respect to the optical elements is not particularly limited; and may be based on the locations of the optical elements and the degree of masking required for each element. The masking section may have portions opaque to infrared and portions transparent to infrared; for example, in an alternative embodiment a masking section having the same pattern as the masking section of FIG. 6b may be produced from a material that is transparent to infrared provided with a pattern of infrared-opaque paint thereon, leaving portions 625a and 625b unpainted and transparent to infrared.

The masking in FIG. 6b is such that infrared radiation from the detection zone of the at least one optical element (e.g. the optical element 610a) is attenuated but not completely blocked, such that some infrared radiation from the detection zone of the optical element 610a is able to reach the detector via the optical element 610a.

An opaque masking section with holes or voids to provide a desired masking pattern provides a simple construction and allows accurate levels of attenuation to be produced.

Figure 6C:
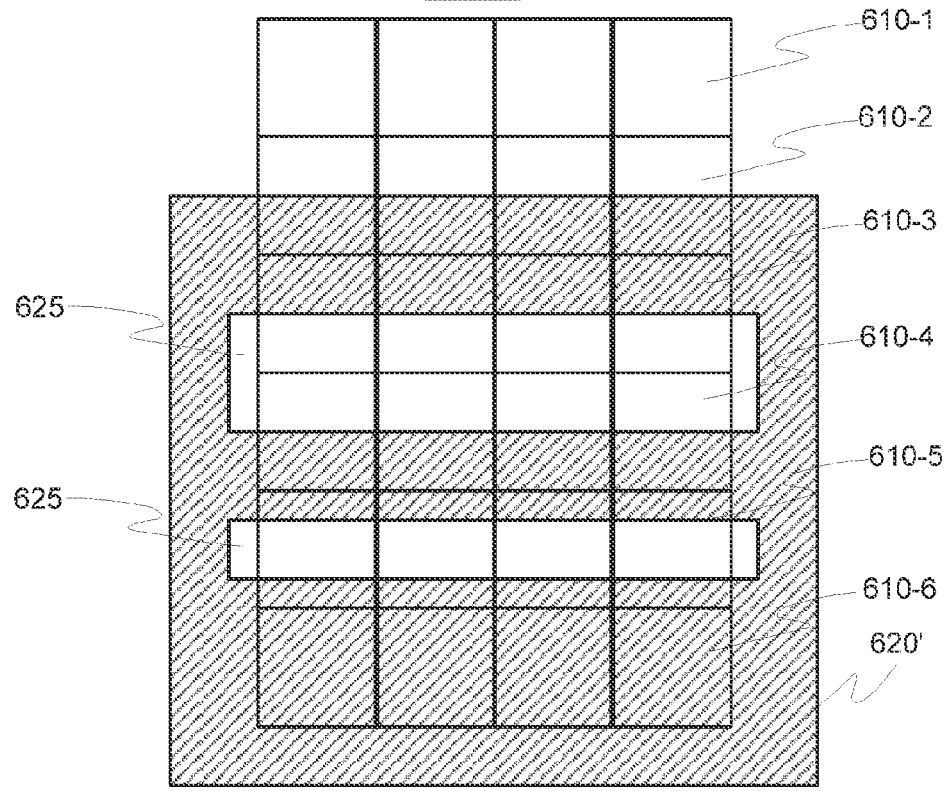
FIG. 6c is a schematic illustration of the optical section of FIG. 6a and an alternative masking section in accordance with an embodiment of the invention.

FIG. 6c shows another example of a masking section 620'. Masking section 620' is similar to masking section 620 of FIG. 6b, and as in FIG. 6b row 610-1 is unmasked, row 610-6 is completely masked and rows 610-3, 610-4 and 610-5 are partially masked. The masking section 620' of FIG. 6c differs from that of FIG. 6b in that row 610-2 is also partially masked. In this arrangement, no additional hole or void is provided in the masking section 620' corresponding to the unmasked portion of row 610-2: the unmasked portion of row 610-2 corresponds to a region beyond the edge of the masking section 620', and the masked portion of row 610-2 corresponds to an infrared-opaque region of the masking section 620'.

Figure 7A:
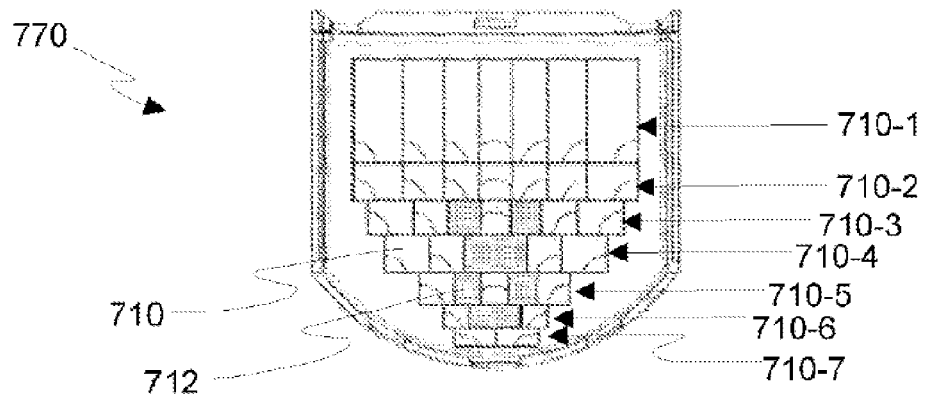
FIG. 7a illustrates an optical section.
Figure 7B:
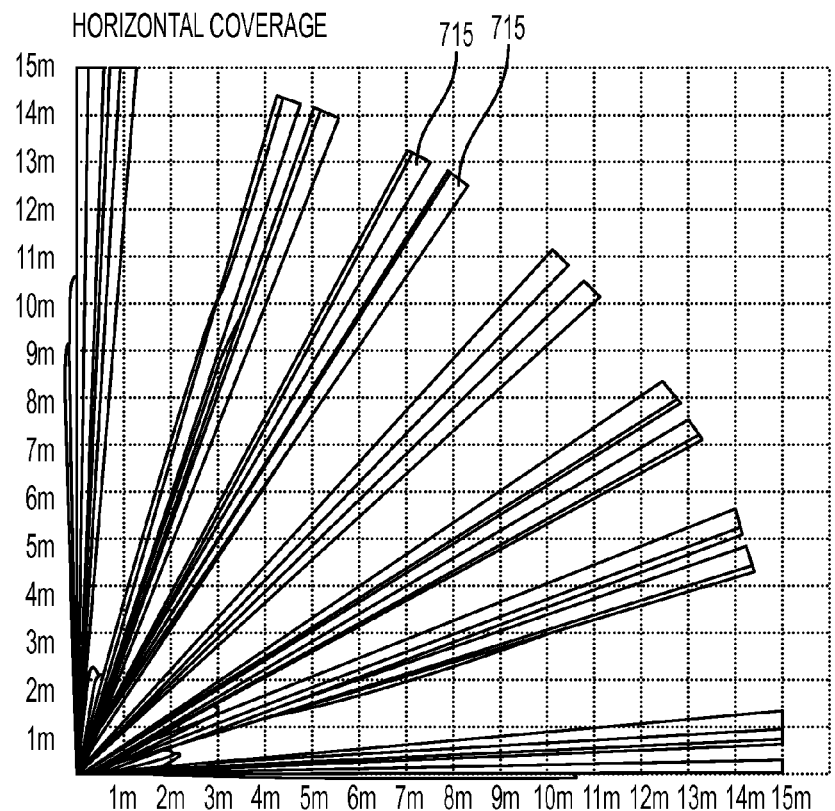
Figure 7B:
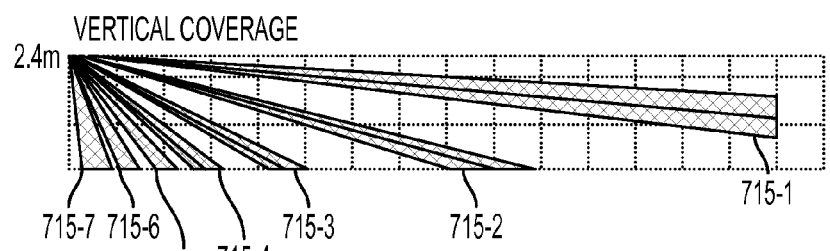

FIG. 7a illustrates an example of an unmasked optical section 770 usable with the embodiment of FIG. 3. The optical section includes a plurality of optical elements 710, which are Fresnel facets in the present example. In the embodiment there are also portions where optical elements are not formed 712, although these are not essential. The arrangement of the Fresnel facets and the portions without facets produces a pattern of detection zones. The properties of the Fresnel facets, such as the centre of the respective Fresnel masters also affects the pattern of detections zones, as would be appreciated by the skilled person. In this example, the optical elements are arranged in rows 710-1 to 710-7, with row 710-1 corresponding to an uppermost detection zone and row 710-7 corresponding to a lowest detection zone. FIG. 7b shows top and side views of the detection zones. In the top view (horizontal coverage) the detection zones corresponding to the uppermost row 710-7 of Fresnel facets extends furthest (horizontally) from the detector, while successively lower rows of facets have corresponding detection zones with correspondingly shorter horizontal extent (in this example due at least in part to intersecting with the floor). The side view (vertical coverage) shows the detection zones 715-1 to 715-7 respectively corresponding to rows 710-1 to 710-7.

The present embodiment includes a pair of pyroelectric elements, as described above in relation to FIG. 3. This arrangement produces a pair of fields of view associated with each Fresnel facet; each pair of fields of view forming a detection zone. These pairs of fields of view can be seen in FIG. 7b.

Figure 7C:
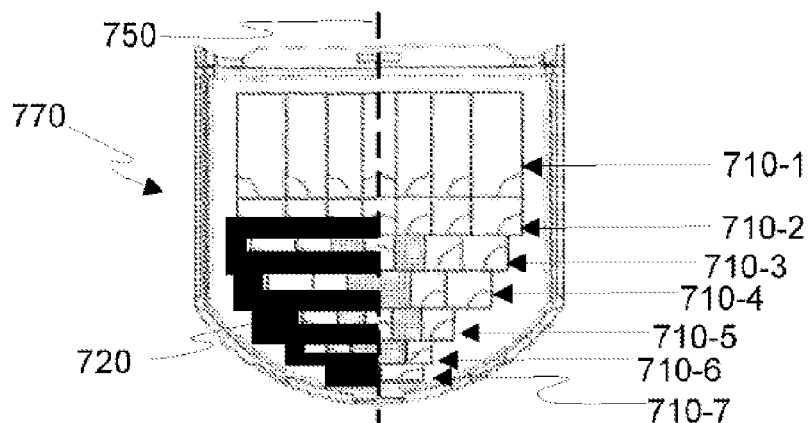
FIG. 7c illustrates the optical section of FIG. 7a and a masking section.

FIG. 7c shows the optical section 770 of FIG. 7a, indicating the masking by the masking section 720. The masked optical section 375 is shown on the left side of FIG. 7c and, for reference, the unmasked optical section 375 is shown on the right side of FIG. 7c. The masking section 720 of the present embodiment is left/right symmetric about line 750 (with the right side of the masking section 720 not shown), such that the masking of the right side of FIG. 7c is the same as that on the left. The masking section of this embodiment is opaque to infrared radiation. Row 710-1 is not masked, and so the detection zones associated with this row are not affected by the presence of the masking section 720. Rows 710-2 to 710-6 are partially masked by the masking section 720, such that infrared radiation received from detection zones corresponding to these rows are attenuated by comparison with the case of FIGS. 7a and 7b, where the masking section is not present. Row 710-7 is blocked (completely masked) by the masking section, such that no infrared radiation reaches the detector via the optical elements in this row.

Figure 7D:
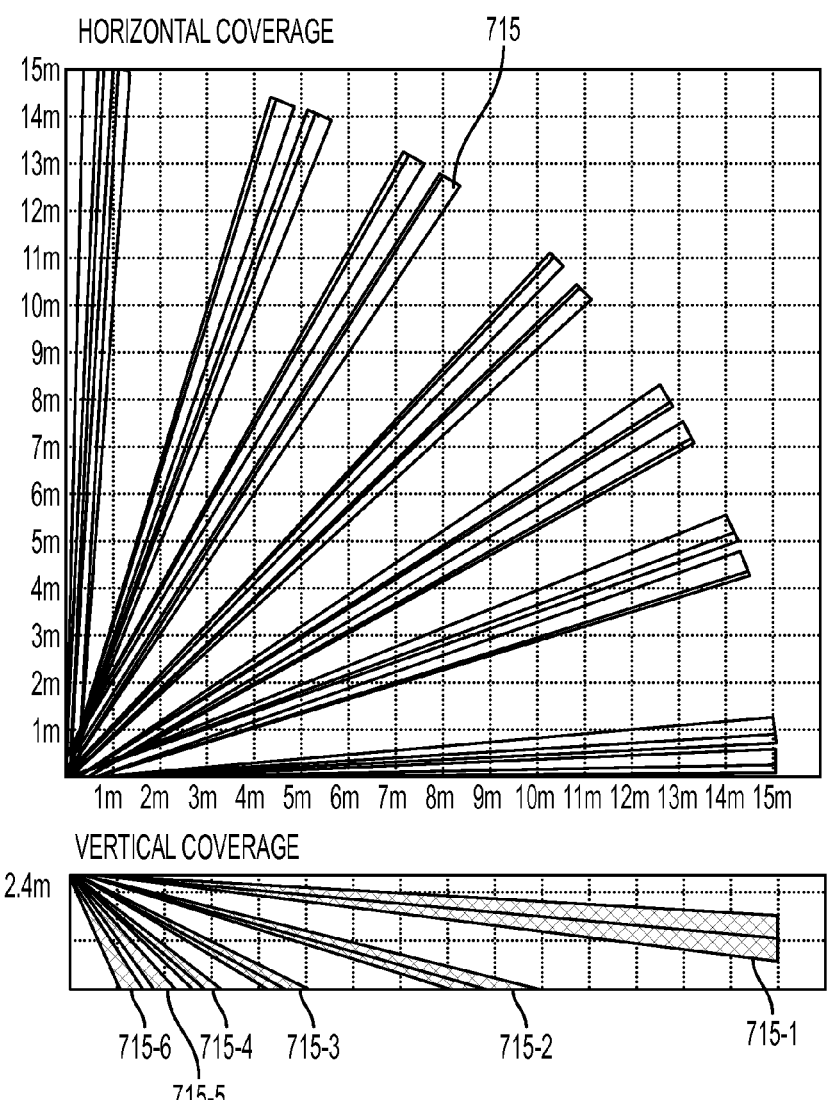
FIG. 7d illustrates the detection zones associated with the masked optical section of FIG. 7c.

FIG. 7d shows the detection zones resulting from the masking shown in FIG. 7c. As can be seen in the side view (vertical coverage) there is no detection zone 715-7 corresponding to row 710-7, as this row is blocked (completely masked). Infrared radiation from detection zones 715-2 to 715-6 is attenuated by the masking section, although this is not illustrated in FIG. 7c. In some cases the attenuation by the masking section may lead to a reduction in the range of the detection zone; here range is used to mean the effective distance from the detection device at which an intruder may be detected measured horizontally from the device. However, for a detection zone that intersects the floor when the device is installed or in use, the reduction in range of the masked detection zone becomes irrelevant if the range after masking exceeds the distance to the intersection with the floor, as that the detection zone after masking still extends to the floor and so is unchanged in practice. This is the case illustrated in FIG. 7d, where zones 715-2 to 715-6 extend to the floor even after masking, and detection zone 715-1 is not masked. Accordingly, these detection zones have the same extent in FIGS. 7b and 7d. It is noted that detection zone 715-2 of FIG. 7d, for example, extends $10m$ from the detection device (when installed at a height of 2.4 m over a level floor). For many domestic applications, a detection range of 10 m is unnecessary (for example in a $5m$ by $5m$ room), and so reduction of the range of this zone to less than 10 m (e.g. to the length of the diagonal across the room) by masking may be acceptable in this case.

The degree of masking or attenuation may vary between each optical element or between rows of optical elements. The lower optical elements, or optical elements corresponding to lower detection zones, may be more strongly attenuated/masked.

Considering the partially masked optical element at the centre of row 710-3 in FIG. 7c, it can be seen that there are partially masked optical elements along respective first and second substantially perpendicular directions. For example the optical element at the centre of row 710-5 and any of the other optical elements in row 710-3. In use, there is at least one partially masked optical element having a lower detection zone than that of the central element in row 710-3 (e.g. any optical element in rows 710-4 to 710-6) and at least one partially masked detection element having a detection zone substantially horizontally level with that of element 710-3 (e.g. any other optical element in row 710-3). There is at least one optical element having a higher detection zone that that of the central element of row 710-3 that is unmasked by the masking section (e.g. any element of row 710-1). There is at least one unmasked optical element above the central element of row 710-3 (i.e. the central element of row 710-1).

In the embodiment of FIG. 7c, blocked optical elements in row 710-7 have detection zones lower, in use, than the detection zones of the partially masked optical elements (e.g. in rows 710-2 to 710-6). The blocked optical elements in row 710-7 are located below partially blocked optical elements (when the detector is installed/in use).

The inventor of the present application found that for the infrared detector illustrated in FIGS. 7a and 7b, for each of the optical elements that was to be partially masked, a masking proportion of more than 60% was necessary in many cases to distinguish between a human and a pet, and in many of these cases, masking exceeding 70% was required. For many of these applications, masking up to 90% was found to give good results. The masking proportions here are in terms of the area of the optical element that is masked.

When considering the amount of attenuation for each optical element by the masking section with 0% being no attenuation and 100% being no transmission (by that optical element), a range of 60% to 90% was found to give good results for many applications. Attenuation in a range of 70% to 90% was found to provide improved results in some applications.

A collection of masking sections having different levels and patterns of attenuation may be provided as a kit. The kit may include other components of the detection device (for example those in FIG. 3), such as the optical section, housing, circuit board, etc. The masking sections may be arranged to be removable subsequent to use/installation.

A method for modifying an infrared detection device according to an embodiment includes partially masking a first optical element of the plurality of optical elements by placing a masking section such that a first part of the first optical element is masked by a portion of the masking section that is opaque to infra-red radiation.

Figure 8:
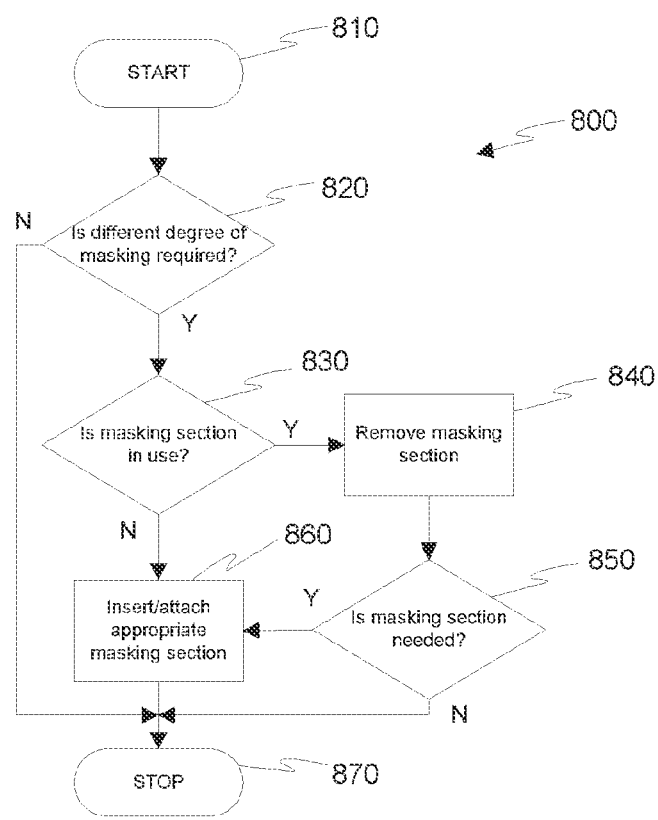
FIG. 8 is a flow chart illustrating a method according to the invention.

FIG. 8 illustrates a method 800 for modifying an infrared detection device according to a further embodiment. The method starts at step 810, and at step 820 it is determined whether a different degree of masking is required or is desired. If no change in the degree of masking is required the method ends at step 870. If a different degree of masking is required, the method proceeds to step 830, and it is determined whether a masking section is already in use (e.g. installed or attached). Where no masking section is in use, a new masking section is inserted/attached or otherwise applied to the detecting device in step 860 and the method terminates at step 870. On the other hand, if a masking section is already in use, it is removed in step 840, and it is decided at step 850 whether a masking section is needed or desirable. For example, where a pet is no longer present, it may be unnecessary and undesirable to continue masking or partially masking a detection zone. Where no masking section is needed, the method terminates at step 870. If a masking section is needed, a new or different masking section is selected and applied to the detector (e.g. installed or attached) in step 860. The method then terminates at step 870.

The method of FIG. 8 may be repeated iteratively to select a masking section to be used by testing the suitability of the installed masking section and repeating the method as needed. The method of FIG. 8 may be performed on installation of the detecting device, or may be performed later, for example if there is a change in the environment or in the performance required from the device. In some embodiments, the masking sections may be arranged such that removal of a previously present masking section is not necessary. For example, complimentary masking sections may be provided that can be used in combination. An example of such an arrangement in the embodiment of FIG. 7 may provide independent masking sections for each row of optical elements. This allows greater individual control over the masking applied to each row of optical elements.

The embodiments above used the example of Fresnel facets (or portions of Fresnel facets) as optical elements. However, the invention in not particularly limited and any suitable optical element could be used. For example, other types of lenses could be used, such as cylindrical lenses. Fresnel facets have the advantage that the shape of the corresponding detection zone is not affected when an opaque masking section is used to partially mask the facet.

The materials and production methods of the various elements are not particularly limited. The housing 350a, 350b and the elements of the optical module 370 (including the optical elements) may be molded plastic.

The optical sections and masking sections exemplified about have been substantially symmetrical, but this need not be the case. Furthermore, the examples show optical elements grouped in rows, but other arrangements and groupings are possible.

The masking section may include infrared-translucent portions, in addition to the infrared-opaque portions. However, it is preferable that the masking of at least one partially masked optical element is due only to an infrared-opaque portion of the masking section.

The detection device may provide signals indicative of a detection, or indicative of a detection state (e.g. True or False), to an external processor or to an external alarm. Alternatively, "raw" signals may be passed from the detection device for processing externally to determine whether a detection has occurred. The detection device may include a processor and/or an alarm.

The embodiments herein have been described in terms of an intrusion detection device, and in particular to an intrusion detection device arranged to avoid false alarms due to pets or small animals. However, the invention is not limited to intrusion detection devices, and may be used in infrared detectors in other applications where selective attenuation of infrared radiation from detection zones is desired.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An infra-red detection device comprising:
    an infra-red detection section;
    a plurality of optical elements arranged to direct infra-red radiation to the infrared detection section; and
    a masking section arranged to partially mask a first optical element of the plurality of optical elements, such that a first part of the first optical element is masked and a second part of the first optical element is not masked, and such that the masking section is arranged to attenuate infra-red radiation directed via the first optical element, wherein
    the first optical element is such that a detection zone associated with the first optical element is unaffected by the presence or absence of the masking section, and
    the first part of the first optical element is masked by a portion of the masking section that is opaque to infrared radiation.

2. The infrared detection device of claim 1, wherein each optical element is a Fresnel facet.

3. The infra-red detection device of claim 1, wherein the masking section partially masks optical elements positioned along respective first and second, substantially perpendicular, directions from the first optical element.

4. The infra-red detection device of claim 1, wherein the masking section partially masks a lower optical element arranged, when in use, to have a detection zone lower than a detection zone of the first optical element.

5. The infra-red detection device of claim 4, wherein attenuation by the masking section is less for infrared from the detection zone of the first optical element than for infrared from the detection zone of the lower optical element.

6. The infra-red detection device of claim 4, wherein a proportion of the first optical element masked by the masking section is less than a proportion of the lower optical element masked by the masking section.

7. The infra-red detection device of claim 1, arranged such that at least one upper optical element has a detection zone higher, when in use, than the detection zone of the first optical element, and the upper optical element is not blocked by the masking section.

8. The infra-red detection device of claim 1, wherein at least one optical element is completely masked by the masking section.

9. The infra-red detection device of claim 1, wherein the masking section is removable.

10. A kit comprising the infra-red detection device of claim 1 and a plurality of masking sections, the masking sections arranged to differ from each other by masking different optical elements and/or masking different proportions of the optical elements.

11. A method of modifying an infra-red detection device having an infra-red detection section and a plurality of optical elements arranged to direct infra-red radiation from respective detection zones onto the infra-red detection section, the method comprising:
    partially masking a first optical element of the plurality of optical elements by placing a masking section such that a first part of the first optical element is masked by a portion of the masking section that is opaque to infra-red radiation, wherein
    the first optical element is such that the detection zone associated with the first optical element is unaffected by the presence or absence of the masking section.

12. The method of claim 11, further comprising removing previous masking section before partially masking the first optical element.

13. The infrared detection device of claim 1, wherein the masking section has a slot shaped hole corresponding to an unmasked portion of the first optical element.

14. The infrared detection device of claim 1, wherein the masking section is in contact with the first optical element.

* * * * *